(12) United States Patent
Yang et al.

(10) Patent No.: US 10,585,293 B2
(45) Date of Patent: Mar. 10, 2020

(54) LIGHT SOURCE AND DISPLAY SYSTEM

(75) Inventors: Yi Yang, Shenzhen (CN); Fei Hu, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 76 days.

(21) Appl. No.: 14/352,532

(22) PCT Filed: Aug. 13, 2012

(86) PCT No.: PCT/CN2012/080058
§ 371 (c)(1),
(2), (4) Date: Sep. 8, 2014

(87) PCT Pub. No.: WO2013/056594
PCT Pub. Date: Apr. 25, 2013

(65) Prior Publication Data
US 2015/0023012 A1    Jan. 22, 2015

(30) Foreign Application Priority Data

Oct. 17, 2011  (CN) .......................... 2011 1 0315025
Dec. 15, 2011  (CN) .......................... 2011 1 0420930

(51) Int. Cl.
G02B 27/14    (2006.01)
G02B 27/10    (2006.01)
(Continued)

(52) U.S. Cl.
CPC ......... G02B 27/141 (2013.01); G02B 27/102 (2013.01); G02B 27/1006 (2013.01);
(Continued)

(58) Field of Classification Search
CPC .............. G02B 27/1006; G02B 27/102; G02B 27/141; G02B 27/145; G02B 27/146; G02B 27/149; F21V 9/20
(Continued)

(56) References Cited

U.S. PATENT DOCUMENTS 7,547,114 B2    6/2009  Yi et al.
2005/0174775 A1  8/2005  Conner
(Continued)

FOREIGN PATENT DOCUMENTS

CN    101093287 A    12/2007
CN    101702063 A    5/2010
(Continued)

OTHER PUBLICATIONS

English Machine Translation of CN 102073139.*
(Continued)

Primary Examiner — Zheng Song
(74) Attorney, Agent, or Firm — Chen Yoshimura LLP

(57) ABSTRACT

Disclosed are a light source and a display system. The light source comprises at least one original light emitting device group (1) and at least one supplementary light emitting device group (2). The original light emitting device group (1) comprises at least two LED (11, 12, 13) and a wavelength light combining device (14, 15), wherein the energy of the overlapped spectrum in the normalized spectrum of the two LED is smaller than 50% of the smaller energy of the two, and the wavelength light combining device combines the light output from all the LED in the original light emitting device group (1) in a wavelength light combining way. The supplementary light emitting device group (2) comprises at least one LED (21). The energy of the overlapped spectrum in the normalized spectrum of any LED of the supplementary light emitting device group (2) and at least one LED of the original light emitting device group (1) is larger than or equal to 10% of the smaller energy of the two. The light source also comprises a geometric light combining device (31), which combines the light finally output from the original light emitting device group (1) and the light finally output from the supplementary light emitting (Continued)

device group (2) into one beam of light in a geometric light combining way.

14 Claims, 10 Drawing Sheets

(51) Int. Cl.
 *G02B 27/09* (2006.01)
 *F21V 9/20* (2018.01)
(52) U.S. Cl.
 CPC ......... *G02B 27/145* (2013.01); *G02B 27/146* (2013.01); *F21V 9/20* (2018.02); *G02B 27/0994* (2013.01)
(58) Field of Classification Search
 USPC .......................... 362/84, 231; 359/618–640
 See application file for complete search history.

(56) References Cited

U.S. PATENT DOCUMENTS

| | | | | |
|---|---|---|---|---|
| 2005/0248733 | A1* | 11/2005 | Sakata | H04N 9/3117 353/94 |
| 2005/0264173 | A1 | 12/2005 | Wang et al. | |
| 2006/0007538 | A1* | 1/2006 | Robinson | G02B 27/102 359/487.04 |
| 2006/0262282 | A1* | 11/2006 | Magarill | H04N 9/3105 353/94 |
| 2008/0205077 | A1* | 8/2008 | Lenderink | G02B 27/0905 362/555 |
| 2009/0121154 | A1* | 5/2009 | Westphal | G01N 21/6458 250/484.4 |
| 2010/0188022 | A1* | 7/2010 | Gerlach | H05B 33/0866 315/312 |
| 2011/0292343 | A1* | 12/2011 | Papac | A61B 3/0008 351/221 |
| 2012/0147333 | A1* | 6/2012 | Jorgensen | G03B 33/06 353/31 |
| 2012/0182525 | A1* | 7/2012 | Imai | G03B 21/2033 353/20 |
| 2012/0212955 | A1* | 8/2012 | Salm | H05B 33/0857 362/231 |

FOREIGN PATENT DOCUMENTS

| | | |
|---|---|---|
| CN | 201589089 U | 9/2010 |
| CN | 101968170 A | 2/2011 |
| CN | 102073139 A | 5/2011 |
| TW | 200925650 A | 6/2009 |
| WO | 2009016604 A1 | 2/2009 |

OTHER PUBLICATIONS

English Machine Translation of CN 101093287 from Espacenet.*
International Search Report in the parent PCT application No. PCT/CN2012/080058, dated Dec. 13, 2012.
IPRP in the parent PCT application No. PCT/CN2012/080058, dated Apr. 22, 2014.
Extended European Search Report and Written Opinion, dated May 11, 2015, in a counterpart EP application, No. EP 12841287.1.
Chinese Office Action, dated Oct. 29, 2013, and Search Report dated Oct. 21, 2013, in a counterpart Chinese patent application, No. CN 201110420930.9.
Chinese Office Action, dated Jul. 30, 2014, in a counterpart Chinese patent application, No. CN 201110420930.9.

* cited by examiner

LIGHT SOURCE AND DISPLAY SYSTEM

FIELD OF THE INVENTION

This invention relates to solid state lighting, and in particular, it relates to a light source and a display system.

DESCRIPTION OF THE RELATED ART

A solid state lighting device, including LED (Light Emitting Diode) and LD (Laser Diode), is a solid state semiconductor device which can directly convert electrical power into visible light.

The LED and phosphor-covered LED (PC-LED) are suitable in general lighting as lighting sources. The working mechanism of a phosphor-covered LED is to coat phosphor onto the surface of LED chip in order to emit fluorescent light from the phosphor which is excited by the LED light. The most common example of phosphor-covered LED is to coat yellow phosphor onto the surface of blue LED to emit white light which is a combination of the yellow light generated by the yellow phosphor excited by the blue light emitted from the blue LED and remaining blue light which is not absorbed. Moreover, there is LED product on the market which emits amber light by amber phosphor coated on a blue LED. The phosphor-covered LED has the same advantage and disadvantage as LED, so the term LED mentioned in the following text includes LED chip and phosphor-covered LED.

U.S. Pat. No. 7,547,114 describes another form of solid state light source. In this method, a solid state light source is used to emit excitation light to excite a rotating phosphor wheel to generate a fluorescent light or a mixed light of a fluorescent light and the excitation light. The phosphor wheel can include one kind of phosphor, or include multiple kinds of phosphors to generate color light sequence. In this method, the excitation light source can be LED or laser diode.

Therefore, solid state lighting device refers to lighting device which uses LED or LD to emit light directly or to excite fluorescent material to emit light. There are many specific forms of solid state lighting devices and they are not described one by one here. In the following text, LED is used as an example for description, but other sorts of solid state lighting devices can be used, people skilled in the art can directly replace the LED source in the examples of the present invention by other kinds of solid state lighting devices to achieve the beneficial effect of the present invention.

Conventional LED light sources achieve R (red), G (green), B (blue) and W (white) color light illumination using an existing technology as shown in FIG. 1, which is a schematic view of a LED arrangement in RGBW form. Four LED chips emitting different color lights are arranged and packaged to be tightly close to each other, and a light collection device is used to collect the lights. The LED light source in the art can emit red light, green light, blue light and white light, and each LED can be controlled respectively to achieve a large color gamut and large modification scope of color saturation.

However, the etendue of the LED light source is the sum of the etendue of the four LED. According to etendue conservation principle, the smaller the etendue of the light source, the higher the brightness, so the LED light source in this existing technology cannot generate high brightness light while achieving RGBW color illumination.

FIG. 2 illustrates a light source with reduced etendue according to a second conventional technology. As shown in FIG. 2 the light source combines light beams output from R (red), G (green), B (blue) LEDs into one light beam by using a cross shaped dichroic mirror, and the etendue of this light source is equal to that of one single LED. Although there is advantage in terms of etendue, the optical structure of FIG. 2 cannot combine other LED beams whose spectra have large overlap with spectrum of anyone of the R, G, B LED, such as white light beam which is commonly used to increase brightness. Therefore it is still limited in terms of brightness.

SUMMARY OF THE INVENTION

To solve this problem, the present invention provides a light source and a display system to overcome the disadvantage of the conventional technology in its inability to combine the light beam of another LED whose spectrum has large overlap with the spectrum of any LED in the original light emitting device group.

To achieve the goal mentioned above, the present invention provides a light source, comprising at least one original light emitting device group and at least one supplementary light emitting device group, wherein the original light emitting device group comprises at least two LEDs and a wavelength-based light combining device, wherein the energy of the overlapping portion of the normalized spectra of the two LEDs is smaller than 50% of the smaller energy of the two, and the wavelength-based light combining device combines the light output from all the LEDs in the original light emitting device group using wavelength-based light combination, and wherein the supplementary light emitting device group comprises at least one LED, wherein the energy of the overlapping portion of the normalized spectra of any LED of the supplementary light emitting device group and at least one LED of the original light emitting device group is larger than or equal to 10% of the smaller energy of the two;

The light source also comprises a geometric-based light combining device, which combines the light finally output from the original light emitting device group and the light finally output from the supplementary light emitting device group into one beam of light using geometric-based light combination.

The present invention also provides a display system, comprising the light source mentioned above.

From the technical method mentioned above it is can be known that compared with conventional technology, the light source of the present invention can combine the light beam output from another lighting device whose spectrum has a large overlap with the spectrum of any lighting device in the original light emitting device group. Moreover, because the etendue of the light beam finally output from the original light emitting device group is equal to the etendue of one of the lighting devices of the group, and the etendue of the light beam finally output from the supplementary light emitting device group is equal to the etendue of one of the lighting devices of the group, so the total etendue after the geometric-based light combination is equal to the sum of the etendue of one lighting device in the original light emitting device group and one lighting device in the supplementary light emitting device group. Compared with the conventional technology, the method of the present invention can reduce the etendue of the entire light source and increase the brightness of the light source while combining the light beam of another lighting device whose spectrum has a large overlap with the spectrum of any lighting device in the original light emitting device group.

BRIEF DESCRIPTION OF THE DRAWINGS

To explain the embodiments of the present invention and the conventional technology more clearly, the figures used in the description of the embodiments and the conventional technology are briefly described below. Obviously, the figures described below are only on embodiments of the present invention, and people skilled in the art can obtain other figures based on the provided figures without creative work.

DETAILED DESCRIPTION OF THE PREFERRED EMBODIMENTS

To make the reference clear, below is a summary of technical terms, acronyms and abbreviations used in the following text and figures:

LED: light emitting diode.

Wavelength-based light combining device: a device combining two light beams into one light beam by making use of the difference of wavelength.

Geometric-based light combining device: a device combining two light beams into one light beam by making use of the difference of spatial position.

In the description of the embodiments of the present invention LED is exemplarily used for detailed explanation, but this does not limit the use of other kinds of solid state lighting devices. People skilled in the art can directly replace the LED source used in the examples of the present invention with other kinds of solid state lighting devices to achieve the benefit effect of the present invention. Solid state lighting device can be light emitting diode, laser diode or lighting device which emits fluorescent light by fluorescent material excited by at least one of the light emitting diode and the laser diode, or the combination of at least two among these three.

Preferred embodiments of the present invention are clearly described with reference to the Figures. Obviously the embodiments described here are only a part of the embodiments of the present invention but not all. Based on the embodiments of the present invention, other embodiments obtained by people skilled in the art without creative work are also protected by the present invention.

It can be seen from the background description that although four, namely red, green, blue, white LEDs can be easily combined geometrically, the etendue of the entire light source will be the sum of etendue of the four LEDs so that high brightness cannot be achieved. And in the second conventional technology where three, namely red, green, blue light beams are combined by a commonly used wavelength-based light combining device (such as cross shaped dichroic mirror or X plate), the etendue can be controlled to be about the etendue of one LED, but the commonly used wavelength-based light combining device cannot effectively combine the light beams whose normalized spectra have large overlap. For example, when the light beam output from white LED needs to be combined with red, green, blue three light beams to improve brightness, because the spectrum of white the LED has large overlaps with that of the red, green, blue light beams due to the relatively wide spectrum of the white light, the wavelength-based light combining device cannot be directly used for effective light combination.

After considering the disadvantages of the two conventional technology mentioned above, the present invention provides a light source which uses wavelength-based light combination in combination with geometric-based light combination.

Figure 15:
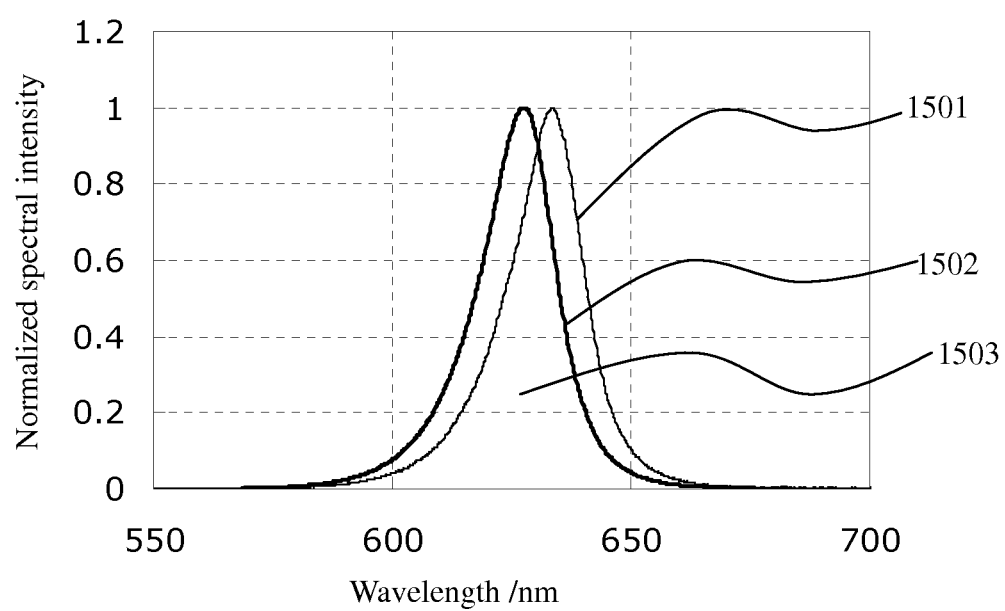
FIG. 15 illustrates normalized lighting spectra of two LED.

In the following text, the ratio of the energy of the overlapping part of two normalized spectra to the smaller energy of the two is used to describe the degree of overlapping of the two spectra. For example for the normalized spectra of two LED 1501 and 1502 shown in FIG. 15, the energy of the overlapping part 1503 is the area of the region 1503, and the energies of the normalized spectra 1501 and 1502 are the areas of their enclosed regions respectively. The energy of the normalized spectrum 1502 is slightly larger than that of the normalized spectrum 1501. The energy of the overlapping part 1503 is about 80% of the smaller energy 1501 of the two original spectra. If a wavelength-based light combining device is used to combine these two light spectra, the energy loss will be 30~40%. It is unacceptable for a normal optical system, so geometric-based light combining method should be used to combine the two light spectra 1501 and 1502.

The present invention provides a light source including at least one original light emitting device group and at least one supplementary light emitting device group, wherein the original light emitting device group includes at least two LED and a wavelength-based light combining device, wherein the energy of the overlapping portion of the normalized spectra of the two LED is smaller than 50% of the smaller energy of the two, and the wavelength-based light combining device combines the light output from all the LED in the original light emitting device group, wherein the supplementary light emitting device group includes at least one LED, and the energy of the overlapping portion of the normalized spectra of any LED of the supplementary light emitting device group and at least one LED of the original light emitting device group is larger than or equal to 10% of the smaller energy of the two;

The light finally output from the original light emitting device group and the light finally output from the supplementary light emitting device group are combined by a geometric-based light combining device into one beam of light.

The light source provided by the embodiments of the present invention can combine the light beam of another LED whose spectrum has a large overlap with the spectrum of any LED in the original light emitting device group.

In the present invention, the light finally output from the original light emitting device group and the light finally output from the supplementary light emitting device group are geometrically combined on different cross sections or a same cross section or the combination of these two of the geometric-based light combining device.

Moreover, the category and amount of the LED in the original light emitting device group can be selected to meet the requirement of display; for example, to meet the requirement of three primary colors display, the original light emitting device group can include a red LED, a blue LED and a green LED. There is no limit on the inner structure of the supplementary light emitting device group, as long as the energy of the overlapping portion of the normalized spectra of any LED of the supplementary light emitting device group and at least one LED of the original light emitting device group is larger than or equal to 10% of the smaller energy of the two. So the supplementary light emitting device group can be white LED itself or multiple primary color LEDs. Preferably, the energy of the overlapping portion of the normalized spectra of any LED of the supplementary light emitting device group and at least one LED of the original light emitting device group is larger than or equal to 50% of the smaller energy of the two.

Moreover, there are many types of geometric-based light combining devices; for example, using of a single lens, the light beams output from the original light emitting device group and the supplementary light emitting device group can be joined on the light incident surface of the lens to achieve the geometric-based light combination of the two light beams. Of course two or more elements also can be used to realize the geometric-based light combining device.

In the following text, embodiments of the present invention are explained in detail, and they are different in whether the light beams finally output from the original light emitting device group and the supplementary light emitting device group are geometrically combined on a same cross section.

Embodiment One

Figure 1:
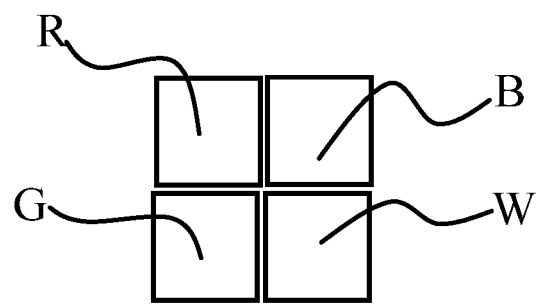
FIG. 1 is the schematic view of the packaging structure of LED light source in a first conventional technology.
Figure 2:
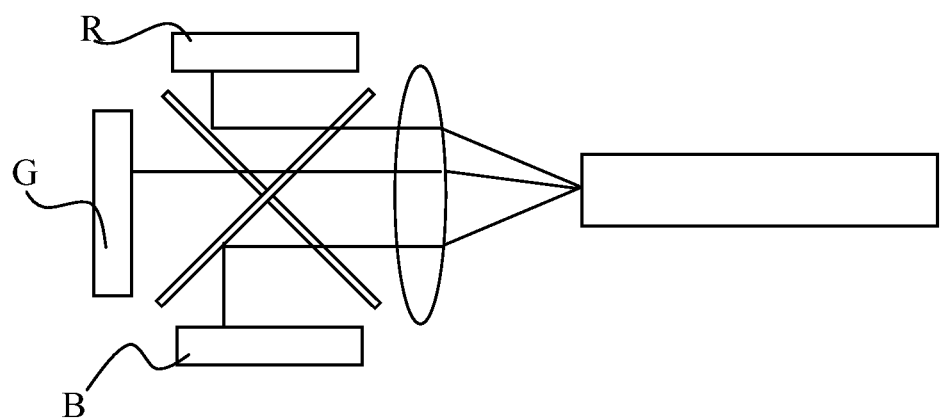
FIG. 2 is the schematic view of the structure of LED light source in a second conventional technology.
Figure 3:
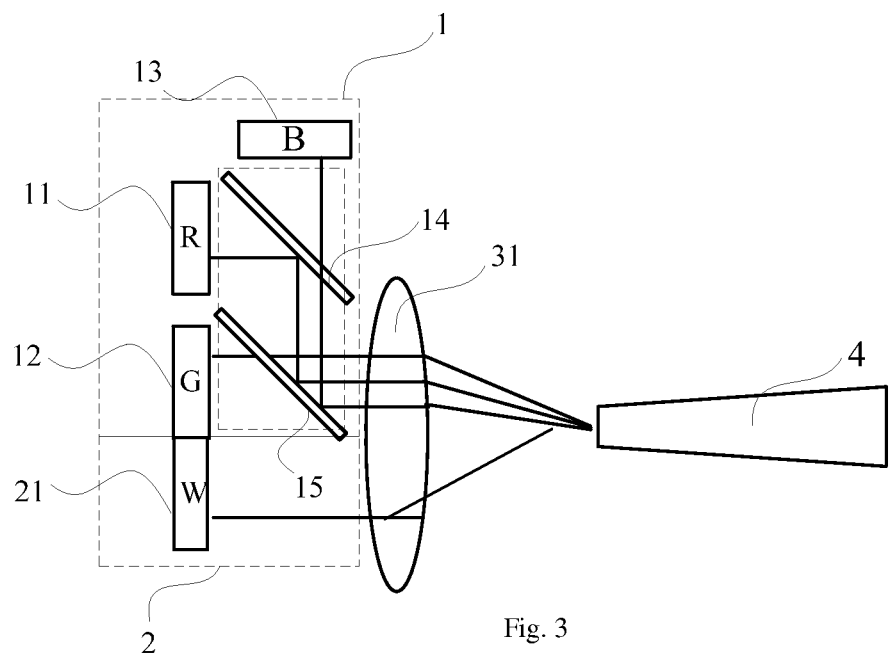
FIG. 3 is the schematic view of an embodiment of the light source in the present invention.

FIG. 3 illustrates an embodiment of the light source of the present invention. In the present embodiment, the light beams from the original light emitting device group and the supplementary light emitting device group are finally output on different cross sections of the geometric-based light combining device. For easier explanation, in the following text words 'upper, 'lower are used to describe the spatial relationship of the various elements, and refer to upper side and lower side in the Figure respectively.

Refer to FIG. 3, in the present embodiment, in particular the original light emitting device group including three primary color LED is used as an example for explanation. Specifically the original light emitting device group 1 includes a red LED 11 (labeled in the Figure as R), a green LED 12 (labeled in the Figure as G) and a blue LED 13 (labeled in the Figure as B). People skilled in the art should know that in fact there is no limit to the amount of the LED used in the original light emitting device group; it can be selected based on practical requirements. Moreover even in a three primary colors display circumstance the light source with red LED, green LED and blue LED as shown in FIG. 3 is not the only choice.

Because the overlapping of the normalized spectra of any two LED in the original light emitting device group is quite small, usually the energy of the overlapping portion of the normalized spectra is smaller than 5% of the smaller energy of the two, a wavelength-based light combining device can be used to combine the lights. In FIG. 3 in particular, the wavelength-based light combining device is, for example, two parallel tilted dichroic mirrors (labeled in the Figure as 14 and 15). It should be understood that there is no limit on the category and number of the wavelength-based light combining devices, as long as it can combine light beams output from LED in the original light emitting device group using wavelength-based light combination. In the present embodiment the geometric-based light combining device is a lens 31, and the supplementary light emitting device group 2 includes a white LED 21 (labeled in the Figure as W).

When the two parallel dichroic mirrors 14, 15 as shown in FIG. 3 are used to realize wavelength-based light combination, the locations of red LED 11, green LED 12 and blue LED 13 can be flexibly adjusted, as long as light beam output from a first LED can be transmitted on the front side of a first dichroic mirror 14 and reflected on the front side of a second dichroic mirror 15, the light beam output from a second LED can be reflected on the back side of the first dichroic mirror 14 and reflected on the front side of the second dichroic mirror 15, and light beam output from a third LED can be transmitted on the back side of the second dichroic mirror 15, and finally the three light beams output from the front side of the second dichroic mirror 15 are coaxial.

After the locations of red LED 11, green LED 12 and blue LED 13 are decided, the category of two dichroic mirrors are selected based on the locations of the three LEDs. For example, when the locations of red LED 11, green LED 12 and blue LED 13 are as shown in FIG. 3, the first, upper dichroic mirror 14 needs to be selected to transmit blue light and reflect light of other wavelengths, and the second, lower dichroic mirror 15 needs to be selected to transmit green light and reflect light of other wavelengths.

Taking FIG. 3 as an example, the tilted angle of the first dichroic mirror 14 and the second dichroic mirror 15 with respect to horizontal direction is 135 degrees. The blue LED 13 is located above the first dichroic mirror 14; the light beam output from the blue LED 13 transmits through the first dichroic mirror 14 and is reflected by the second dichroic mirror 15 to lens 31. The red LED 11 is located on the back side of the first dichroic mirror 14; the light beam output from the red LED 11 is reflected by the first dichroic mirror 14 and the second dichroic mirror 15 in turn to the lens 31. The green LED 12 is located on the back side of the second dichroic mirror 15; the light beam output from the green LED 12 transmits through the second dichroic mirror 15 to the lens 31.

The light source of the present embodiment also includes a white LED 21. The energy of the overlapping portion of the normalized spectra of the white LED 21 and at least one LED of the original light emitting device group is larger than or equal to 10% of the smaller energy of the two. For example, the energy of white LED 21 is larger than that of the red LED 11 in the original light emitting device group, and the energy of the overlapping portion of the normalized spectra of the white LED 21 and the red LED 11 is larger than or equal to 10% of the energy of red LED 11. Preferably, the energy of white LED 21 is larger than that of any LED in the original light emitting device group, and the energy of the overlapping portion of the normalized spectra of the white LED 21 and any LED in the original light emitting device group is larger than or equal to 50% of the smaller energy of the two. Because the light beams output from the red LED 11, green LED 12 and blue LED 13 are combined by the wavelength-based light combining device to form a white light beam, the energy of the overlapping portion of the normalized spectra of the white light beam of the combined red LED 11, green LED 12 and blue LED 13 and the white light beam of the white LED 21 is larger than or equal to 10% of the smaller energy of the two; therefore wavelength-based light combining method cannot be used to combine these two white lights, and geometric-based light combining method can be used.

In the present embodiment, the light beam finally output from the original light emitting device group, namely the combined light beam of the light beams output from the red LED 11, green LED 12 and blue LED 13, and the output light of the white LED 21 are incident respectively on the upper and lower cross sections of the lens 31 and geometrically combined on the two cross sections. The cross section of a lens in the present invention refers to the cross section in horizontal direction of a lens.

To achieve the geometric joining of the light beams output from the original light emitting device group and the supplementary light emitting device group at the incident position of the lens, the light beams output from the red LED 11, green LED 12 and blue LED 13 and the light beam output from the white LED 21 can be geometrically joined in the space before the lens 31; a convenient method is to set the white LED 21 and the original light emitting device group 1 as close to each other as possible. For example, as shown in FIG. 3, because the optical axis of the light beam of the green LED 12 is the optical axis of the combined light beam of all the LEDs in the original light emitting device group, if the white LED 21 is located adjacent the green LED 12, the goal mentioned above can be achieved. It is can be understood that, the optical axes of light output from the green LED 12 and the light output from the white LED are located on the upper and lower cross sections of the lens 31.

Preferably, in the present embodiment the red LED 11, green LED 12 and blue LED 13 and the white LED 21 are arranged along a first line, and the blue LED 13, the first dichroic mirror 14 and the second dichroic mirror 15 are arranged along a second line, wherein the first line and the second line are parallel so that the structure is more compact and heat dissipation of LEDs is easier.

In the light source of the present invention, wavelength-based light combination and geometric-based light combination are used in combination, so that the light beam output from another LED whose spectrum has a large overlap with spectrum of any LED in the original light emitting device group can be combined into the light source.

Furthermore, because the etendue of the light beam finally output from the original light emitting device group is equal to the etendue of one LED in the group, and the etendue of the light beam finally output from the supplementary light emitting device group is equal to the etendue of one LED in the group, the total etendue after the geometric-based light combination is equal to the sum of the etendue of one LED in the original light emitting device group and one LED in the supplementary light emitting device group. Compared with the conventional technology, the method of the present invention can reduce the etendue of the entire light source and increase the brightness of the light source while the light beam of another LED whose spectrum has a large overlap with the spectrum of any LED in the original light emitting device group is combined.

Moreover, after the geometric-based joining, the light output from the lens 31 can be directly focused into a light homogenizing device 4. In particular the homogenizing device 4 can employ a homogenizing rod as shown in FIG. 3; of course it can also employ other kinds of homogenizing elements such as fly-eye lens, Fresnel lens etc.

Embodiment Two

Figure 4:
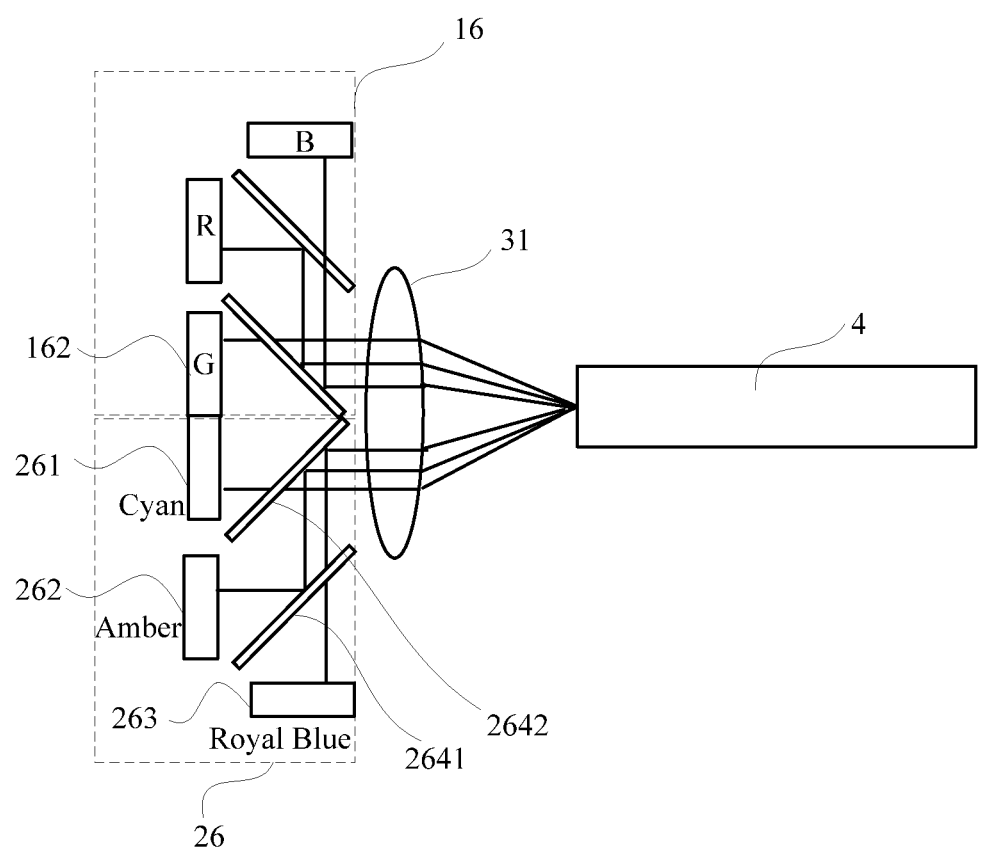
FIG. 4 is the schematic view of an alternative embodiment of the light source in the present invention.

FIG. 4 illustrates an alternative embodiment of the light source. The light beams finally output from an original light emitting device group and a supplementary light emitting device group are still not on a same cross section of a geometric-based light combining device. But in the embodiment described above the supplementary light emitting device group consists of a white LED; in fact to achieve the goal of supplementary lighting, the supplementary light emitting device group can consists of multiple LED whose spectra have large overlaps with any LED in the original light emitting device group.

As shown in FIG. 4, the supplementary light emitting device group 26 includes, for example, a cyan LED 261 (labeled in the Figure as Cyan), an amber LED 262 (labeled in the Figure as Amber), a royal blue LED 263 (labeled in the Figure as Royal Blue). The three light beams output from the cyan LED 261, the amber LED 262 and the royal blue LED 263 are combined by a wavelength-based light combining device in the supplementary light emitting device group. As shown in FIG. 4, the wavelength-based light combining device in the supplementary light emitting device group employs two parallel and tilted located dichroic mirrors (labeled in the Figure as 2641 and 2642); it should be understood that it is not a limitation to the type of the wavelength-based light combining device, as long as the light beams output from the LEDs in the supplementary light emitting device group can be combined using wavelength-based light combination. In the present embodiment, the geometric-based light combining device can still employ lens 31.

When multiple light beams of the supplementary light emitting device group are combined by the dichroic mirrors 2641 and 2642 as shown in FIG. 4, the locations of the cyan LED 261, amber LED 262 and royal blue LED 263 corresponds to the categories of the dichroic mirrors 2641 and 2642; therefore, the locations of the cyan LED 261, amber LED 262 and royal blue LED 263 are adjustable, as long as the light beam output from a first LED can be transmitted on the front side of a first dichroic mirror 2641 and reflected on the front side of a second dichroic mirror 2642, the light beam output from a second LED can be reflected on the back side of the first dichroic mirror 2641 and reflected on the front side of the second dichroic mirror 2642, and light beam output from a third LED can be transmitted on the back side of the second dichroic mirror 2642; and finally the three light beams output from the front side of the second dichroic mirror 2642 are coaxial. After the locations of cyan LED 261, amber LED 262 and royal blue LED 263 are decided, the category of two dichroic mirrors are selected based on the locations of the three LEDs. For example, when the locations of cyan LED 261, amber LED 262 and royal blue LED 263 are as shown in FIG. 4, the first, lower dichroic mirror 2641 needs to be selected to transmit royal blue light and reflect light of other wavelengths, and the second, upper dichroic mirror 15 needs to be selected to transmit cyan light and reflect light of other wavelengths.

Taking FIG. 4 as an example, in the supplementary light emitting device group, the tilted angle of the first dichroic mirror 2641 and the second dichroic mirror 2642 with respect to horizontal direction is 45 degrees. The royal blue LED 263 is located below the first dichroic mirror 2641, and the light beam output from the royal blue LED 263 transmits through the first dichroic mirror 2641 and is reflected by the second dichroic mirror 2642 to the lens 31. The amber LED 262 is located on the back side of the first dichroic mirror 2641, and the light beam output from the amber LED 262 is reflected by the first dichroic mirror 2641 and the second dichroic mirror 2642 in turn to the lens 31. The cyan LED 261 is located on the back side of the second dichroic mirror 2642, and the light beam output from the cyan LED 261 transmits through the second dichroic mirror 2642 to the lens 31.

The light beam output from the original light emitting device group 16 through wavelength-based light combination and the light beam output from the supplementary light emitting device group 26 through wavelength-based light combination are geometrically combined by the geometric-based light combining device; the two light beams are joined on the incident surface of lens 31.

Because the light beam finally output from the original light emitting device group 16 is coaxial with the light beam output from one LED in the group (the green LED 12 in FIG. 4), and the light beam finally output from the supplementary light emitting device group 26 is coaxial with the light beam output from one LED in the group (the cyan LED 261 in FIG. 4), when adjusting the relative locations of the original light emitting device group 16 and the supplementary light emitting device group 26, the green LED 12 and the cyan LED 261 can be adjacent to each other without any gap, so that the space is used effectively.

In the present embodiment, the light beam finally output from the original light emitting device group (namely the combined output light beam of light beams output from the red LED 11, green LED 12 and blue LED 13 by wavelength-based light combination), and the light beam finally output from the supplementary light emitting device group (namely the combined output light beam of light beams output from the cyan LED 261, amber LED 262 and royal blue LED 26 by wavelength-based light combination) are incident respectively on the upper and lower cross sections of the lens 31 and geometrically combined on the two cross sections. It can be understood that the axis of the output light of green LED 162 and the axis of the output light of cyan LED 261 are located respectively on the upper and lower cross sections.

Preferably, in the present embodiment the red LED 11, green LED 12, cyan LED 261 and amber LED 262 are arranged along a first line, and the blue LED 13, the first dichroic mirror 14, the second dichroic mirror 15, the second dichroic mirror 2642, the first dichroic mirror 2641 and the royal blue LED 263 are arranged along a second line, wherein the first line and the second line are parallel so that the structure is more compact and heat dissipation of LEDs is easier.

Embodiment Three

In embodiment one and embodiment two described above, the supplementary light emitting device group is entirely located below the original light emitting device group; of course the supplementary light emitting device group can also be entirely located above the original light emitting device group. In fact, the supplementary light emitting device group can also be located between two LED of the original light emitting device group, such as in an alternative embodiment of the light source of the present invention shown in FIG. 5.

A difference between the light source of the present embodiment and the light source of embodiment one is that the white LED 21 which plays the role of the supplementary light emitting device group is located between the red LED 11 and the green LED 12 of the original light emitting device group.

The inner structure of the original light emitting device group, and the location relationship of the LED and the two dichroic mirrors in the original light emitting device group are the same as in embodiment one, so they are not described here.

Figure 5:
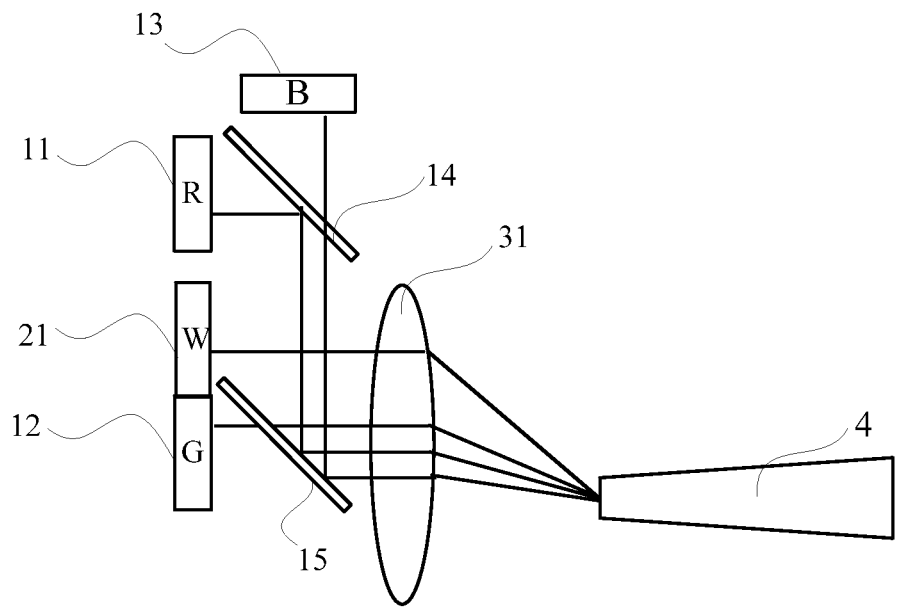
FIG. 5 is the schematic view of an alternative embodiment of the light source in the present invention.

It should be emphasized that in the present embodiment the light beam output from the white LED 21 should avoid the dichroic mirrors of the wavelength-based light combining device of the original light emitting device group. For example, as shown in FIG. 5, the light beam output from the white LED 21 passes through a gap between the first dichroic mirror 14 and the second dichroic mirror 15 and is directly incident onto the lens 31.

In the light source of the present embodiment, wavelength-based light combination and geometric-based light combination are also used in combination so that the light beam output from another LED whose spectrum has a large overlap with spectrum of any LED in the original light emitting device group is combined.

Embodiment Four

Figure 6A:
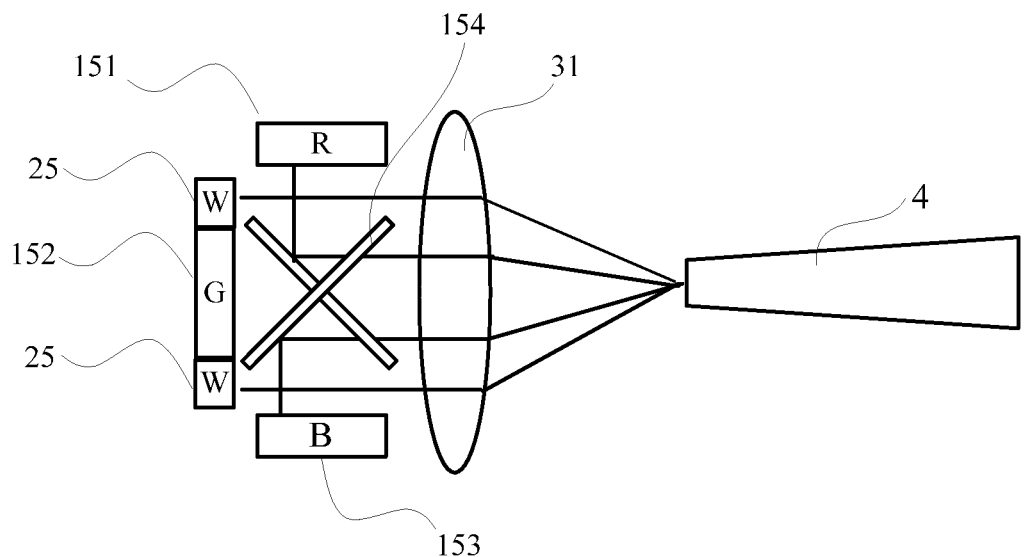
FIG. 6A is the schematic view of an alternative embodiment of the light source in the present invention.

To further improve the compactness of the light source, FIG. 6A illustrates an improved light source which employs a cross shaped dichroic mirror (X Plane for short) as the wavelength-based light combining device. Specifically, the supplementary light emitting device group in the light source of the present embodiment still consists of a white LED 25, and the original light emitting device group includes at least two LED, where the energy of the overlapping portion of the normalized spectra of the two LED is smaller than 50% of the smaller energy of the two LED. In particular, in FIG. 6A, the original light emitting device group includes, for example, a red LED 151, a green LED 152 and a blue LED 153.

The three light beams output from the red LED 151, green LED 152 and blue LED 153 are incident respectively on the three incident surfaces of the cross shaped dichroic mirror 154 and combined by the combining effect of the cross shaped dichroic mirror 154, so that the combined light output from the cross shaped dichroic mirror 154 is a white light beam. It should be understood that the locations of the red LED 151, green LED 152 and blue LED 153 can be interchanged freely; because the locations of the red LED 151, green LED 152 and blue LED 153 and the categories of the two dichroic mirrors in the cross shaped dichroic mirror correspond to each other, if one factor is decided, then another factor is decided.

The white LED 25 are arranged around the LED of the original light emitting device group whose output light directly transmits the cross shaped dichroic mirror 154 (e.g. green LED 152 in FIG. 6A), and the white light output from the white LED 25 travels around the cross shaped dichroic mirror 154 and is incident on the geometric-based light combining device, i.e., the lens 31. The white light beam combined by the cross shaped dichroic mirror 154 is also incident on the lens 31. Because the white light beam combined by the cross shaped dichroic mirror 154 is coaxial with the light beam of LED in the original light emitting device group whose output light directly transmits through the cross shaped dichroic mirror 154, on the incident surface of lens 3, the white light output from the white LED 25 is still located around the white light combined by the cross shaped dichroic mirror 154 to realize the geometric-based combination of the light beam output from the white LED 25 and that from the original light emitting device group.

It should be noted that when there is no element to change the light direction between the cross shaped dichroic mirror 154 and the geometric-based light combining device, i.e., the lens 31, the LED of the original light emitting device group whose output light directly transmits through the cross shaped dichroic mirror 154 is the LED directly facing the incident surface of the lens 31; for example in FIG. 6A the LED directly facing the incident surface of lens 31 is the green LED 152.

Moreover, the white LED 25 can be formed by multiple smaller LED which are arranged around the LED whose output light directly transmits through the cross shaped dichroic mirror 154. For example, when the shape of the green LED 152 shown in FIG. 6A is round, the white LEDs 25 can form a ring shape; and when the shape of green LED 152 is rectangle, the white LED 25 can form a shape of rectangle frame.

The light beam combined by the lens 31 can be incident onto a homogenizing device (homogenizing rod 4 in FIG. 6A) for further homogenization.

It can be seen that the light source of the present embodiment can geometrically combine the white light beam output from the supplementary light emitting device group and the combined light beam output from the original light emitting device group, and can achieve a more compact structure of the entire light source, so that the volume is reduced and the entire device is miniaturized.

Moreover, in an alternative embodiment, the locations of the LED of the original light emitting device group whose output light directly transmits through the cross shaped dichroic mirror 154 and the location of the white LED 25 are interchanged, namely their rounding relationship is exchanged, so that the LED in the original light emitting device group whose output light directly transmits through the cross shaped dichroic mirror are arranged around the white LED 25. The white LED 25 is located at the center of the LED whose output light directly transmits the cross shaped dichroic mirror 154. To ensure that the light beam output from the white LED 25 can avoid the surface of the cross shaped dichroic mirror 154, the traditional cross shaped dichroic mirror 154 needs to be improved. For example a through hole on the central intersecting area of the cross shaped dichroic mirror 154 can be formed to barely permit all the white light beam output from the white LED 25 to pass through the through hole. In this alternative embodiment, on the incident surface of the lens 31, the incident position of the white light beam output from the white LED 25 is located at the center of the combined light beam output from the original light emitting device group. This design can also achieve a more compact structure of the light source and reduce the volume of the light source.

Figure 6B:
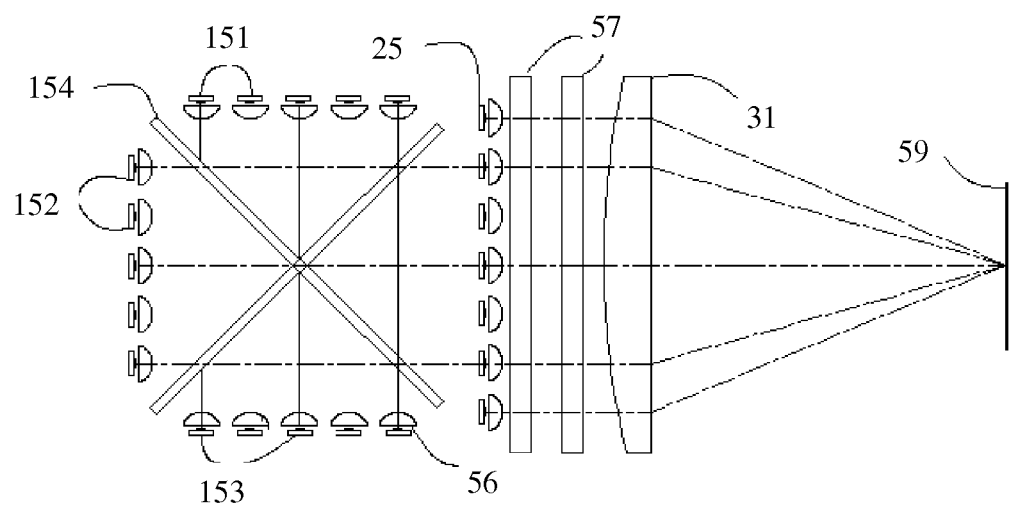
FIG. 6B is the top view of an alternative embodiment of the light source in the present invention.
Figure 6C:
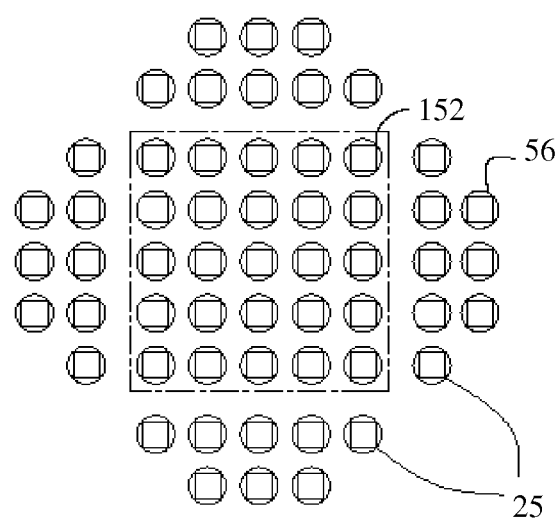
FIG. 6C is the side view of the light source in FIG. 6B.

FIG. 6B illustrates the top view of the light source of the eleventh embodiment, and FIG. 6C illustrates the side view of the light source of that embodiment. A difference from the light source in FIG. 6A is that the white LED 25 of the supplementary light emitting device in the present embodiment are located at the light exit port of the cross shaped dichroic mirror 154, and are arranged around the light beam of the original light emitting device group emitted from the cross shaped dichroic mirror 154. As shown in FIG. 6C, the white LED 25 are arranged in a diamond shape around the light beam of the original light emitting device group; they can also be arranged as rectangle or circle, without limitation. Moreover, in the present embodiment a lens array 56 is provided between the LED of original light emitting device group (including red LED 151, green LED 152 and blue LED 153) and the cross shaped dichroic mirror 154, and a lens array is also provided in the output light path of the white LED 25. The light beam output from the white LED 25 and the combined light combined by red LED 151, green LED 152 and blue LED 153 are first incident onto the fly-eye lens 57 for light homogenization, and then combined into one beam by the lens 31 which acts as the geometric-based light combining device, and then focused onto a pattern plate 59 which has a pre-set pattern.

In the present embodiment, the light beam finally output from the supplementary light emitting device group is located around the light beam finally output from the original light emitting device group, and these two light beams are combined using geometric-based light combination.

Embodiment Five

In embodiment one to embodiment three mentioned above, the light beams finally output from the original light emitting device group and the supplementary light emitting device group are located on different cross sections of the geometric-based light combining device. But in an alternative embodiment of the light source of the present invention shown in FIG. 7, the light beams finally output from the original light emitting device group and the supplementary light emitting device group are located on a same cross section of the geometric-based light combining device.

Figure 7:
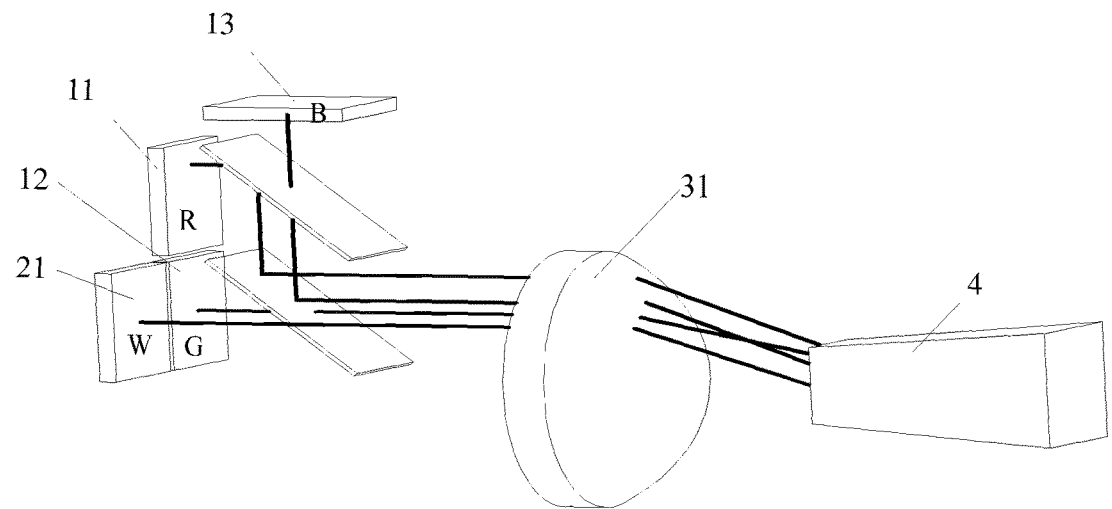
FIG. 7 is the schematic view of an alternative embodiment of the light source in the present invention.

Refer to FIG. 7, in the present embodiment, the original light emitting device group and the supplementary light emitting device group are the same as that of the light source shown in FIG. 3, but their relative locations are changed in the present embodiment, so that the supplementary light emitting device group is located on the left or right of the original light emitting device group. In the embodiment of the present invention, the left-right direction refers to the direction perpendicular to the drawing sheet. The light beam finally output from the original light emitting device group, namely the light beam combined by light beams output from the red LED 11, green LED 12 and blue LED 13, and the light beam output from white LED 21 are incident onto a same cross section of the lens 31, and the light axes of the light beam output from green LED 12 and the light beam output from white LED 21 are both located on this cross section.

Taking FIG. 7 for example, the white LED 21 which forms the supplementary light emitting device group is located on the left of the green LED 12 of the original light emitting device group.

Of course, in addition to the two tiled located dichroic mirrors as shown in FIG. 7, the wavelength-based light combining device in the original light emitting device group can also employ a cross shaped dichroic mirror.

Embodiment Six

In the embodiments described above, the light beams finally output from the original light emitting device group and the supplementary light emitting device group are located on either different cross sections or a same cross section of the geometric-based light combining device. In fact, when the original light emitting device group and the supplementary light emitting device group both include multiple groups, it is possible that the light beams finally output from at least one original light emitting device group and at least one supplementary light emitting device group are located on different cross sections of the geometric-based light combining device, while the light beams finally output from at least another one original light emitting device group and at least another one supplementary light emitting device group are located on a same cross section of the geometric-based light combining device.

Figure 8:
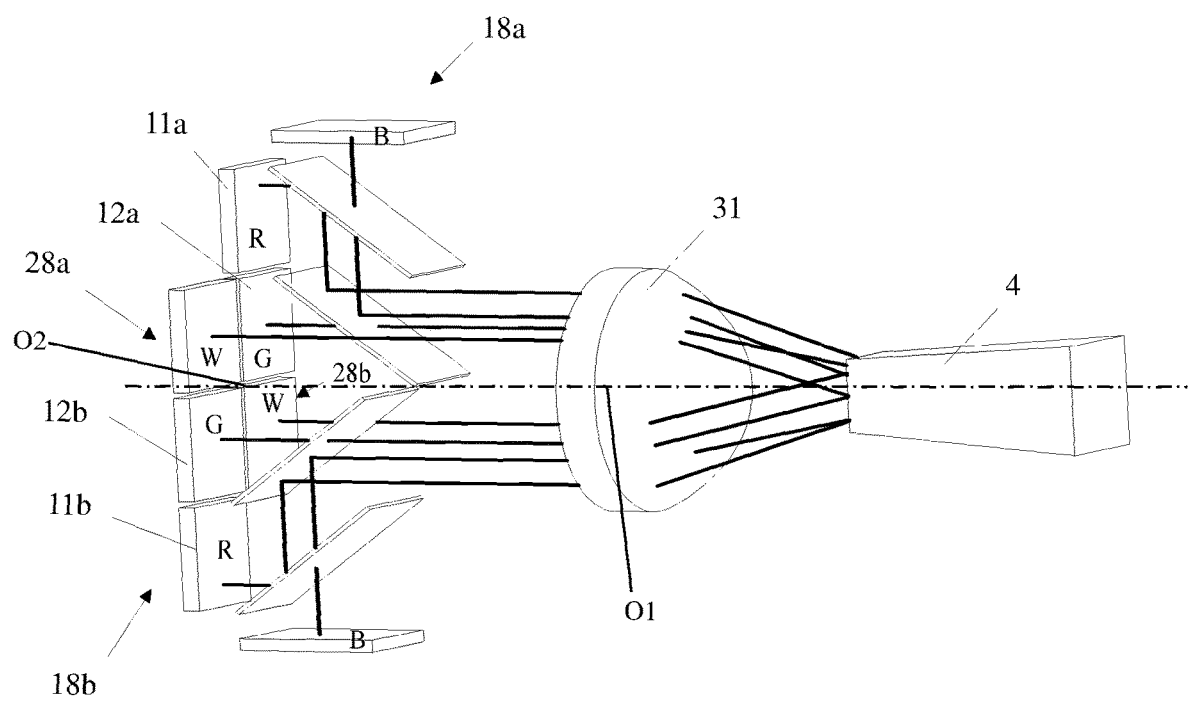
FIG. 8 is the schematic view of an alternative embodiment of the light source in the present invention.

In an alternative embodiment of the light source of the present invention shown in FIG. 8, the original light emitting device group and the supplementary light emitting device group each consists of two groups. As an example, each original light emitting device group has the same structure as the original light emitting device group in embodiment one, and it is not describes again. The inner structures of the original light emitting device group and the supplementary light emitting device group are respectively the same as that shown in FIG. 3, and they are not describes again.

However in the present embodiment the location relationship of these original light emitting device groups and supplementary light emitting device groups is preferably limited. The light beam output from a first original light emitting device group 18*a* and the light beam output from a first supplementary light emitting device group 28*a* are geometrically combined on a same cross section of a geometric-based light combining device (lens 31 in FIG. 8), and the light beam output from the first original light emitting device group 18*a* and the light beam output from a second supplementary light emitting device group 28*b* are geometrically combined on different cross sections of lens 3. In the same manner, the light beam output from a second original light emitting device group 18*b* and the light beam output from the first supplementary light emitting device group 28*a* are geometrically combined on different cross sections of the lens 31, and the light beam output from the second original light emitting device group 18*b* and the light beam output from the second supplementary light emitting device group 28*b* are geometrically combined on a same cross sections of lens 3.

To improve the brightness uniformity of the light beam finally output from the light source, the two light beams output from the two original light emitting device groups are set to be symmetrical with respect to the origin O1 of the cross section of the lens 31, and the two light beams output from the two supplementary light emitting device groups are also set to be symmetrical with respect to the origin O1 on the cross section of the lens 31. A easy method to achieve this setting is to join the two original light emitting device groups and the two supplementary light emitting device groups on a plane parallel to the lens 31 (this plane is called joining plane in the following text), and set the two original light emitting device groups symmetric with respect to the origin O2 of this plane (for example located in the first quadrant and the third quadrant in FIG. 8) and set the two supplementary light emitting device groups symmetric with respect to the origin O2 of this plane (for example located in the second quadrant and the fourth quadrant in FIG. 8).

This way, the brightness uniformity of the light beam finally output from the light source is improved.

To further improve the brightness uniformity, in a more preferable embodiment, the two LEDs of any same color in the two original light emitting device groups are symmetric with respect to the origin of the joining plane. For example, as shown in FIG. 8, the red LED 11*a* in one original light emitting device group located on upper-right side is symmetric with respect to the origin with the red LED 11*b* in another original light emitting device group located on lower-left side; the green LED 12*a* in one original light emitting device group located on upper-right side is symmetric with respect to the origin with the green LED 12*b* in another original light emitting device group located on lower-left side. This design can realize the symmetric arrangement of the light devices in detail, and also can make the two original light emitting device groups have exactly the same structure and the two supplementary light emitting device groups have exactly the same structure as well. Therefore, there is no need to design and fabricate two different structures of the original light emitting device groups and two different structures of the supplementary light emitting device groups, and the designing and fabricating cost are reduced.

Embodiment Seven

The light source provided by the present embodiment is similar to that of embodiment six, in that the original light emitting device group and the supplementary light emitting device group also consist of multiple groups respectively. One difference from embodiment six is that the structure of the supplementary light emitting device group employs the structure of the supplementary light emitting device group in the embodiment shown in FIG. 4.

Figure 9:
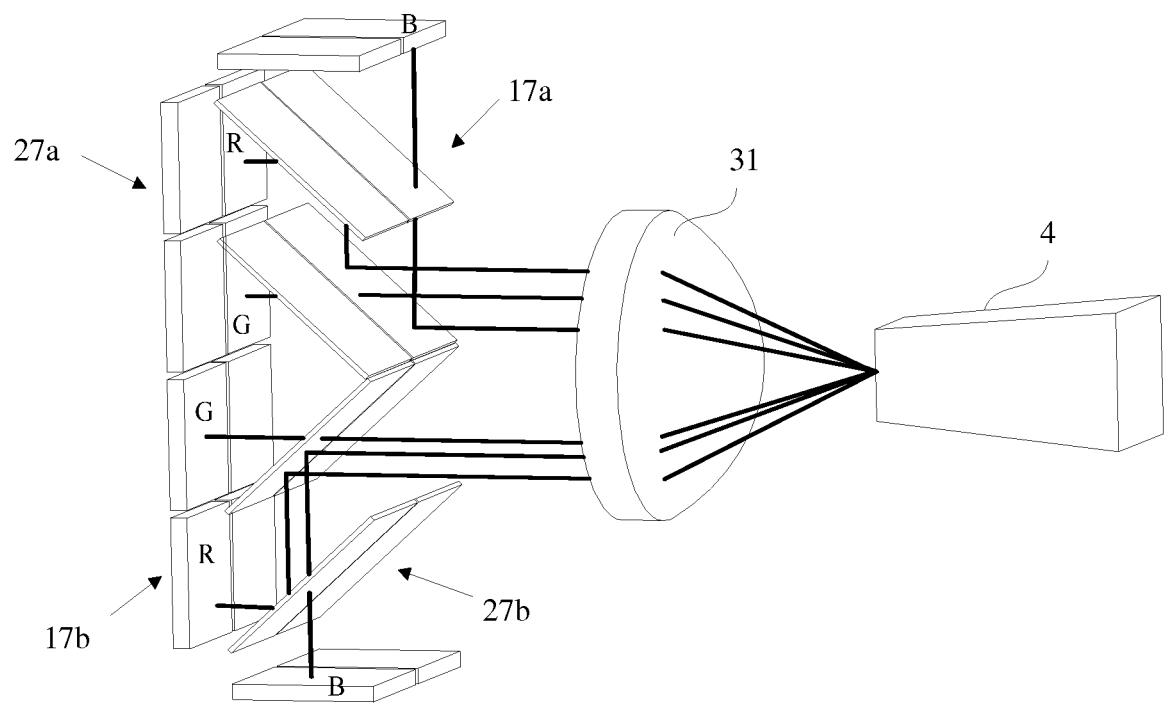
FIG. 9 and FIG. 10 are respectively the schematic views of an alternative embodiment of the light source in the present invention showing light path of an original light emitting device group and a supplementary light emitting device group.
Figure 10:
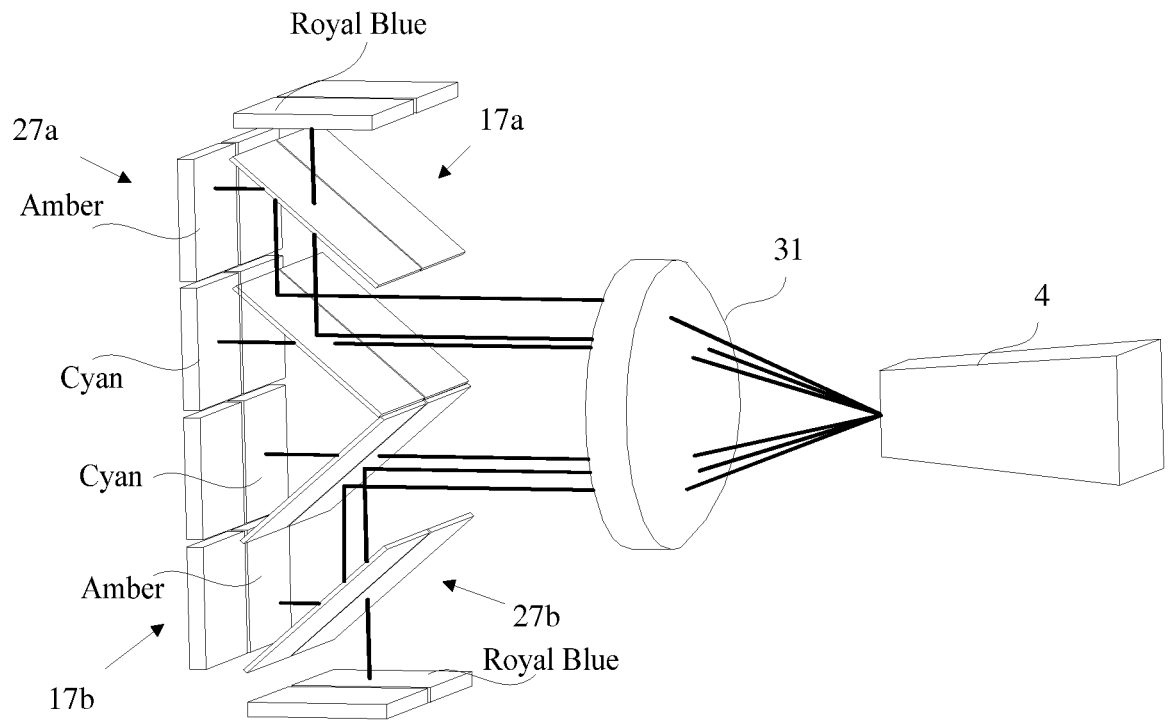

Specifically, FIG. 9 and FIG. 10 illustrate respectively the light paths of the original light emitting device group and the supplementary light emitting device group in the present light source.

In FIG. 9 and FIG. 10, the two original light emitting device groups are respectively labeled as 17*a* and 17*b*, the two supplementary light emitting device groups are respectively labeled as 27*a* and 27*b*.

To improve the brightness uniformity of the light beam finally output from the light source, the two light beams output from the two original light emitting device groups 17*a* and 17*b* are set to be symmetric with respect to the origin on the cross section of the lens 31, and the two light beams output from the two supplementary light emitting device groups 17*a* and 27*b* are also set to be symmetric with respect to the origin on the cross section of the lens 31.

A easy method to achieve this setting is to join the two original light emitting device groups and the two supplementary light emitting device groups on a plane parallel to the lens 31, and set the two original light emitting device groups 17*a* and 17*b* symmetric with respect to the origin of this plane (for example located in the first quadrant and the third quadrant in FIG. 9) and set the two supplementary light emitting device groups 27*a* and 27*b* symmetric with respect to the origin of this plane (for example located in the second quadrant and the fourth quadrant in FIG. 9).

To further improve the brightness uniformity, in a more preferable embodiment, the two LED of any same color in the two original light emitting device groups are symmetric with respect to the origin on the joining plane, and the two LED of any same color in the two supplementary light emitting device groups are also symmetric with respect to the origin on the joining plane. This design can realize the symmetric arrangement of the light devices in detail, and also can make the two original light emitting device groups have exactly the same structure and the two supplementary light emitting device groups have exactly the same structure as well. Therefore, there is no need to design and fabricate two different structures of the original light emitting device groups and two different structures of the supplementary light emitting device groups, and the designing and fabricating cost are reduced.

Embodiment Eight

In the embodiments described above, the geometric-based light combining devices only consist of a lens. In an alternative embodiment shown in FIG. 11, the geometric-based light combining device includes two lenses (respectively labeled as 391 and 392) and a reflector 393.

In the present embodiment, the original light emitting device group 19 includes a red LED 191, a green LED 192 and a blue LED 193. It can be understood that in fact the category and number of LEDs in the original light emitting device group can be selected based on practical requirement of display without limitations. The spectra of the LED in this original light emitting device group do not overlap with each other.

In the present embodiment, the light beams output from the red LED 191 (labeled as R in the Figure), the green LED 192 (labeled as G in the Figure) and blue LED 193 (labeled as B in the Figure) of the original light emitting device group 19 are combined by a cross shaped dichroic mirror 194 using wavelength-based combination. The details of wavelength-based combination and the locations of the LEDs in the original light emitting device group are the same as that of embodiment four, and are not described again.

It should be noted that besides the cross shaped dichroic mirror 194, the wavelength-based light combining device in the original light emitting device group 19 can also employ other kinds of wavelength-based light combining elements, such as two parallel tilted dichroic mirrors, whose detailed structure is shown in embodiment one.

The light beam output from the original light emitting device group 19 is focused by a lens 391.

In the present embodiment, the supplementary light emitting device group 29 includes a white LED 291. It can be understood that the supplementary light emitting device group 29 may be similar to that in embodiment two and includes at least a LED, where the energy of the overlapping portion of the normalized spectra of any LED of the supplementary light emitting device group and at least one LED of the original light emitting device group is larger than or equal to 10% of the smaller energy of the two.

The light beam finally output from the supplementary light emitting device group 29 is focused by lens 392 and then reflected by reflector 393, and then geometrically combined with the output light beam of the original light emitting device group focused by lens 391. The light beam after the geometric-based light combination is incident onto the homogenizing device (homogenizing rod in FIG. 11).

Figure 11:
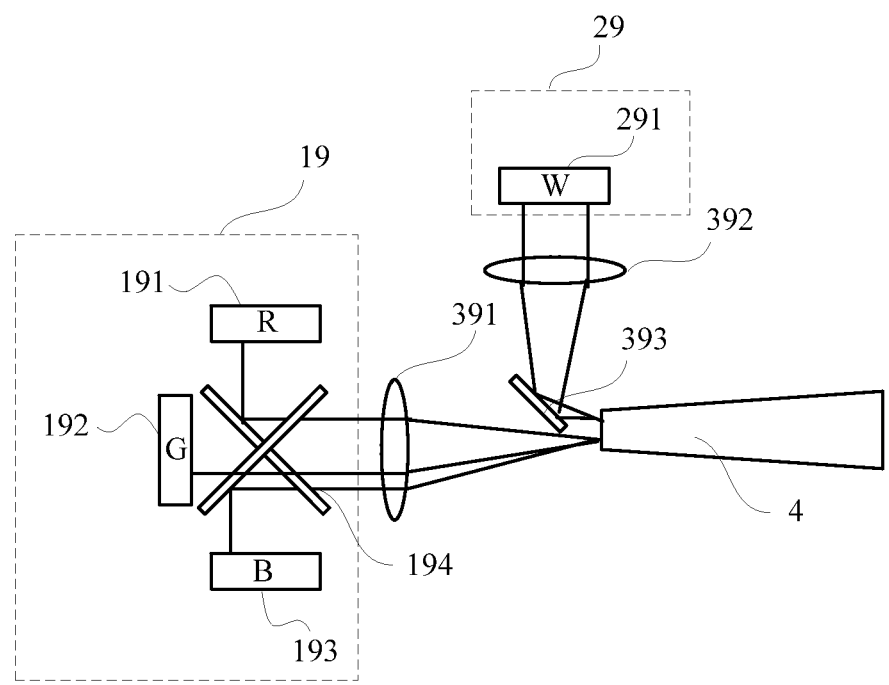
FIG. 11 is schematic view of an alternative embodiment of the light source in the present invention.

As shown in FIG. 11, the light beam finally output from the original light emitting device group 19, namely the output light beam wavelength combined by light beams of red LED 191, green LED 192 and blue LED 193, and the output light beam of the reflector 393 are incident onto different horizontal cross sections of the entrance of the homogenizing rod 4. It can be understood that by adjusting the locations of the white LED 291 and the reflector 393, the output light beam of the reflector 393 and the light beam finally output from the original light emitting device group 19 can be adjusted to be incident onto a same horizontal cross section of the entrance of the homogenizing rod 4.

Embodiment Nine

Compared with the light sources in other embodiments, the structure of the original light emitting device group is improved in the light source of the present embodiment. In the present embodiment shown in FIG. 12, the original light emitting device group includes multiple groups, and the wavelength-based light combining device in each group is two parallel tilted dichroic mirrors. It should be noted that in the present embodiment the corresponding LEDs in different original light emitting device groups are joined together; correspondingly, the dichroic filters of the two original light emitting device groups can also be joined.

Figure 12:
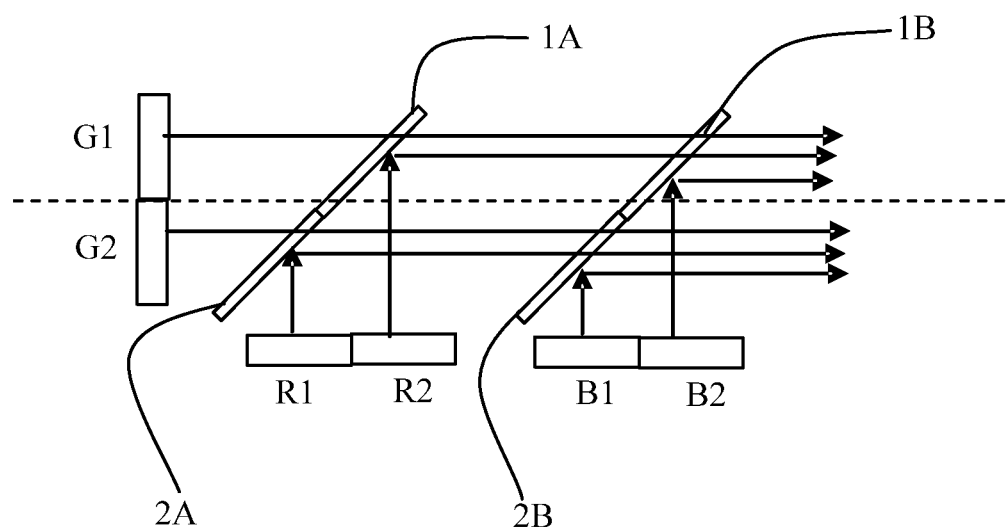
FIG. 12 is schematic view of an original light emitting device group of an alternative embodiment of the light source in the present invention.

Taking FIG. 12 as an example, a first original light emitting device group includes a green LED G1, a red LED R2, and a blue LED B2, and a second original light emitting device group includes a green LED G2, a red LED R1, and a blue LED B1. The light beams output from green LED G1, red LED R2 and blue LED B2 are wavelength combined by dichroic mirrors 1A and 1B, and the light beams output from green LED G2, red LED R1 and blue LED B1 are wavelength combined by dichroic mirrors 2A and 2B.

In FIG. 12, the LED of different original light emitting device groups with similar normalized spectra are joined together; for example, the green LED G1 and green LED G2 are joined together, the red LED R1 and red LED R2 are joined together, and the blue LED B1 and blue LED B2 are joined together. The normalized spectra of the two joined LED can have large overlaps.

Correspondingly, the dichroic mirror 1A and dichroic mirror 2A are joined together, and the dichroic mirror 1B and dichroic mirror 2B are joined together.

It should be noted that the locations of the LEDs in each original light emitting device group correspond to the categories and locations of the dichroic mirrors. For example, in FIG. 12, the green LED G1 is located on the back side of the dichroic mirror 1A, and the green LED G2 is located on the back side of the dichroic mirror 2A; the red LED R2 is located below the dichroic mirror 1A, and the red LED R1 is located below the dichroic mirror 2A; the blue LED B2 is located below the dichroic mirror 1A, and the blue LED B1 is located below the dichroic mirror 2A; and the joined dichroic mirrors 1A and 2A are located on the back side of the joined dichroic mirror 1B and 2B.

A geometric-based light combining device, such as lens, may be provided on the front side of the dichroic mirrors 1B and 2B (not shown in the Figure), which is used to combine the light beams finally output from the first and the second original light emitting device groups into one light beam. In the present invention, the front side refers to the direction of the light ray shown by the arrows, and the back side refers to the opposite direction.

The structure of the wavelength-based light combining device shown in FIG. 12 is compatible with the situation with only one set of red LED, green LED and blue LED.

Figure 13:
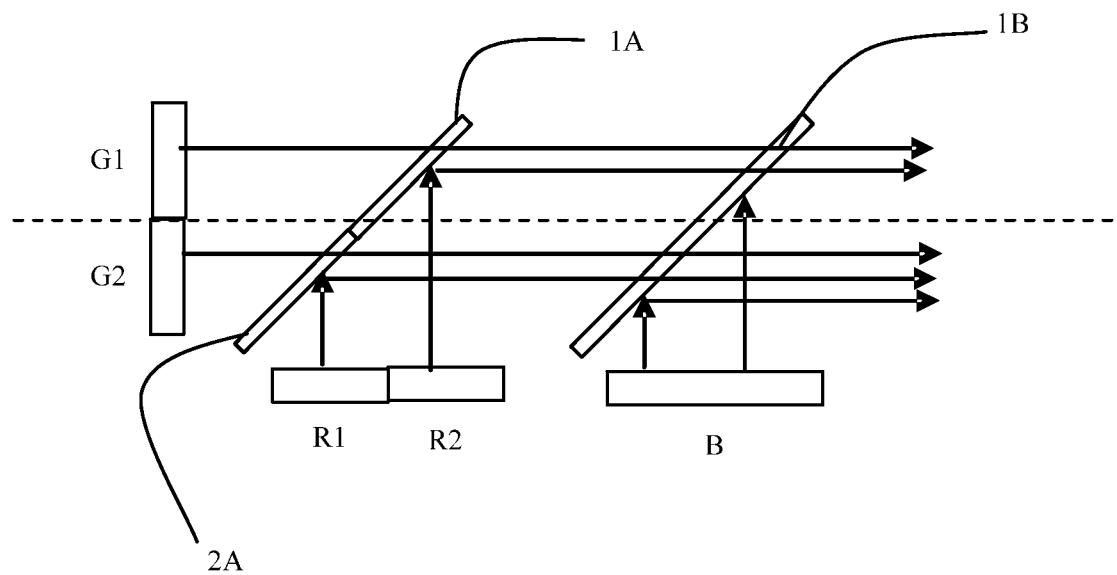
FIG. 13 is schematic view of an original light emitting device group of an alternative embodiment of the light source in the present invention.

Furthermore, the joined LED as shown in FIG. 12 can be one set; for example, in the original light emitting device group shown in FIG. 13, the blue LED is only one set (labeled as B in FIG. 13). Because the light beam output from the blue LED does not overlap with the green LED G1 or the green LED G2, only one dichroic mirror 1B located above the blue LED is needed to combine the lights of the blue LED B with that of the green LED G1 and the green LED G2 respectively.

It can be seen from the description above that the first original light emitting device group and the second original light emitting device group can also be understood as an original light emitting device and a supplementary light emitting device group. Different color lights within each group are combined using wavelength-based light combination, and the combined light beams of the two groups are combined using geometric-based light combination. In FIG. 12, the space above the dashed line is the light path of the original light emitting device group, and the space below the dashed line is the light path of the supplementary light emitting device group; the two light paths are combined into one light beam based on different spatial positions. In fact, the second original light emitting device group can also be understood as a supplementary light emitting device group, and the first original light emitting device group can also be understood as an original light emitting device group.

Embodiment Ten

Compared with the light sources in other embodiments, the structure of the original light emitting device group is improved in the light source of the present embodiment. In the present embodiment, as shown in FIG. 14, the original light emitting device group consists of two groups, and the two set of dichroic mirrors are disposed in a cross shape.

Figure 14:
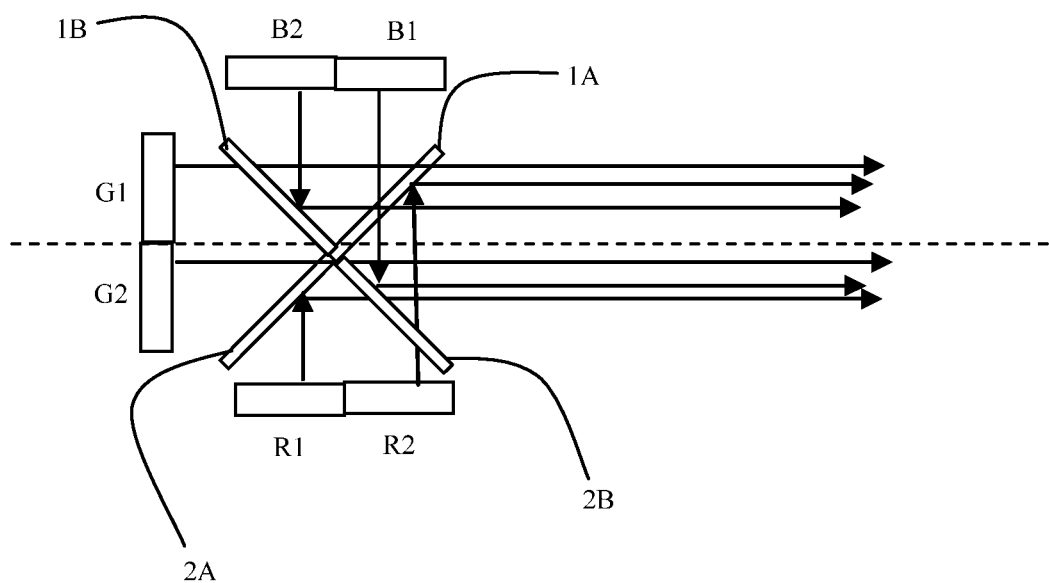
FIG. 14 is schematic view of an original light emitting device group of an alternative embodiment of the light source in the present invention.

As shown in FIG. 14, a first original light emitting device group includes a green LED G1, a red LED R2, and a blue LED B2, and a second original light emitting device group includes a green LED G2, a red LED R1, and a blue LED B1. The light beams output from the green LED G1, the red LED R2 and the blue LED B2 are wavelength combined by the dichroic mirrors 1A and 1B, and the light beams output from the green LED G2, the red LED R1 and the blue LED B1 are wavelength combined by the dichroic mirrors 2A and 2B.

In FIG. 14, the LEDs of different original light emitting device groups that have similar normalized spectra are joined together; for example, the green LED G1 and the green LED G2 are joined together, the red LED R1 and the red LED R2 are joined together, and the blue LED B1 and the blue LED B2 are joined together. The normalized spectra of the two joined LED can have large overlap.

Correspondingly, the dichroic mirror 1A and dichroic mirror 2A are joined together, and the dichroic mirror 1B and dichroic mirror 2B are joined together. The joined dichroic mirrors 1A and 2A and the joined dichroic mirrors 1B and 2B form a cross shaped dichroic mirror set. A geometric-based light combining device such as a lens (not shown in the Figure) can be set in front of this cross shaped dichroic mirror set to combine the light beams finally output from the first and second original light emitting device groups into one light beam.

It can be seen from the description above that the first original light emitting device group and the second original light emitting device group can also be understood as an original light emitting device and a supplementary light emitting device group. Different color lights within each group are combined using wavelength-based light combination, and the combined light beams of the two groups are combined using geometric-based light combination. In FIG. 14, the space above the dashed line is the light path of the original light emitting device group, and the space below the dashed line is the light path of the supplementary light emitting device group; the two light paths are combined as one light beam based on different spatial positions. In fact, the second original light emitting device group can also be understood as a supplementary light emitting device group, and the first original light emitting device group can also be understood as an original light emitting device group.

The original light emitting device group in the present embodiment can significantly reduce the volume.

The embodiments of this description are described in progressive manner, where each embodiment is described to emphasize the differences from other embodiments; for the same or similar parts of the various embodiments, the reader can refer to other embodiments. The devices disclosed by the embodiments correspond to the disclosed methods, so while some descriptions are simplified, the reader can refer to the description of the method.

The embodiments are described to enable people skilled in the art to make and use the present invention. Various modifications to these embodiments are obvious to the people skilled in the art, so the general principle defined by the present invention can be achieved in other embodiments within the scope and spirit of the present invention. Therefore, the present invention is not limited to the embodiments described above, but should have the widest protection scope corresponding to the principles and novel characteristics disclosed by the description.

What is claimed is:

1. A light source, comprising at least one original light emitting device group and at least one supplementary light emitting device group, wherein the original light emitting device group comprises at least a red solid state lighting device, a green solid state lighting device and a blue solid state lighting device and a wavelength-based light combining device, wherein the wavelength-based light combining device combines light output from all the solid state lighting devices in the original light emitting device group using wavelength-based light combination into one combined light beam, the one combined light beam simultaneously containing red, green and blue lights, each of which being unmodulated in a time-domain by any spatial light modulator;

wherein the supplementary light emitting device group comprises at least an amber solid state lighting device, a cyan solid state lighting device, and a royal blue solid state lighting device and another wavelength-based light combining device, wherein the other wavelength-based light combining device combines light output from all the solid state lighting devices in the supplementary light emitting device group using wavelength-based light combination into another combined light beam, the other combined light beam simultaneously containing amber, cyan and royal blue lights, each of which being unmodulated in the time-domain by any spatial light modulator, wherein the other wavelength-based light combining device is disposed outside of an optical path of the light emitted by the solid state lighting devices of the original light emitting device group; and wherein the light source further comprising a geometric-based light combining device, which combines the one combined light beam output from the original light emitting device group and the other combined light beam output from the supplementary light emitting device group into one beam of light using geometric-based light combination.

2. The light source of claim 1, wherein the one combined light beam output from the supplementary light emitting device group surrounds the other combined light beam output from the original light emitting device group, and the one combined light beam and the other combined light beam are combined into one beam of light using geometric-based light combination.

3. The light source of claim 1, wherein the geometric-based light combining device comprises two lenses and a reflector, wherein the one combined light beam output from the original light emitting device group are incident on one of the lenses, and the other combined light beam output from the supplementary light emitting device group are incident on another one of the lenses and reflected by the reflector, so that the one combined light beam output from the original light emitting device group and the other combined light beam output from the supplementary light emitting device group are geometrically combined.

4. The light source of claim 1, wherein the one combined light beam output from the original light emitting device group and the other combined light beam output from the supplementary light emitting device group are geometrically combined on a same cross section of the geometric-based light combining device.

5. The light source of claim 4, wherein the supplementary light emitting device group is located on the left side or right side of the original light emitting device group.

6. A light source, comprising at least one original light emitting device group and at least one supplementary light emitting device group,
wherein the original light emitting device group comprises at least a red solid state lighting device, a green solid state lighting device and a blue solid state lighting device and a wavelength-based light combining device, wherein the wavelength-based light combining device combines light output from all the solid state lighting devices in the original light emitting device group using wavelength-based light combination into one combined light beam, the one combined light beam simultaneously containing red, green and blue lights, each of which being unmodulated in a time-domain by any spatial light modulator;
wherein the supplementary light emitting device group comprises at least an amber solid state lighting device, a cyan solid state lighting device, and a royal blue solid state lighting device and another wavelength-based light combining device, wherein the other wavelength-based light combining device combines light output from all the solid state lighting devices in the supplementary light emitting device group using wavelength-based light combination into another combined light beam, the other combined light beam simultaneously containing amber, cyan and royal blue lights, each of which being unmodulated in the time-domain by any spatial light modulator;
wherein the light source further comprising a geometric-based light combining device, which combines the one combined light beam output from the original light emitting device group and the other combined light beam output from the supplementary light emitting device group into one beam of light using geometric-based light combination;
wherein the original light emitting device group comprises multiple groups, and the supplementary light emitting device group comprises multiple groups;
wherein lights output from at least one of the multiple original light emitting device groups and at least one of the multiple supplementary light emitting device groups are geometrically combined on different cross sections of the geometric-based light combining device, and lights output from the at least one of the multiple original light emitting device groups and at least another one of the multiple supplementary light emitting device groups are geometrically combined on a same cross section of the geometric-based light combining device.

7. The light source of claim 6, wherein a number of the original light emitting device groups is even, and a number of the supplementary light emitting device group is even; wherein the light beams from the original light emitting device groups are one-to-one symmetric with respect to an origin on a cross section of the geometric-based light combining device, and the light beams from the original light emitting device groups are one-to-one symmetric with respect to an origin on a cross section of the geometric-based light combining device.

8. The light source of claim 6, wherein two solid state lighting devices of any same color in at least two original light emitting device groups are symmetric with respect to an origin on a joining plane parallel to the geometric-based light combining device; and two solid state lighting devices of any same color in the supplementary light emitting device group are symmetric with respect to an origin on the joining plane.

9. A light source, comprising at least one original light emitting device group and at least one supplementary light emitting device group,
wherein the original light emitting device group comprises at least a red solid state lighting device, a green solid state lighting device and a blue solid state lighting device and a wavelength-based light combining device, wherein the wavelength-based light combining device combines light output from all the solid state lighting devices in the original light emitting device group using wavelength-based light combination into one combined light beam, the one combined light beam simultaneously containing red, green and blue lights, each of which being unmodulated in a time-domain by any spatial light modulator;
wherein the supplementary light emitting device group comprises at least an amber solid state lighting device, a cyan solid state lighting device, and a royal blue solid state lighting device and another wavelength-based light combining device, wherein the other wavelength-based light combining device combines light output from all the solid state lighting devices in the supplementary light emitting device group using wavelength-based light combination into another combined light beam, the other combined light beam simultaneously containing amber, cyan and royal blue lights, each of which being unmodulated in the time-domain by any spatial light modulator;
wherein the light source further comprising a geometric-based light combining device, which combines the one combined light beam output from the original light emitting device group and the other combined light beam output from the supplementary light emitting device group into one beam of light using geometric-based light combination; and
wherein the one combined light beam output from the original light emitting device group and the other combined light beam output from the supplementary light emitting device group are geometrically combined on different cross sections of the geometric-based light combining device.

10. The light source of claim 9, wherein the wavelength-based light combining device of the original light emitting device group is a cross shaped dichroic mirror or at least one tilted dichroic mirror.

11. The light source of claim 9, wherein the geometric-based light combining device comprises a lens, and wherein the one combined light beam output from the original light emitting device group and the other combined light beam output from the supplementary light emitting device group are joined on a light incident surface of the lens.

12. A display system, comprising the light source of claim 9.

13. The light source of claim 9, wherein the supplementary light emitting device group is located above or below the original light emitting device group.

14. The light source of claim 9, wherein the supplementary light emitting device group is located between two solid state lighting devices of the original light emitting device group.

* * * * *